United States Patent [19]
Feldmann et al.

[11] Patent Number: 5,132,664
[45] Date of Patent: Jul. 21, 1992

[54] OVERLOAD WARNING SYSTEM FOR A TRAILER BRAKE ARRANGEMENT

[75] Inventors: Joachim Feldmann, Neustadt; Manfred Schult, Garbsen, both of Fed. Rep. of Germany

[73] Assignee: WABCO Westinghouse Fahrzeugbremsen GmbH, Hannover, Fed. Rep. of Germany

[21] Appl. No.: 541,602

[22] Filed: Aug. 20, 1990

Related U.S. Application Data

[63] Continuation of Ser. No. 301,213, Jan. 24, 1989, abandoned, which is a continuation of Ser. No. 280,467, Dec. 6, 1988, abandoned.

[30] Foreign Application Priority Data

Dec. 18, 1987 [DE] Fed. Rep. of Germany ....... 3742996

[51] Int. Cl.$^5$ ............................................. B60Q 1/00
[52] U.S. Cl. .................................. 340/453; 340/452; 188/1.11; 303/DIG. 4
[58] Field of Search ............... 340/453, 431, 438, 439, 340/452; 188/1.11; 303/DIG. 1-4

[56] References Cited

U.S. PATENT DOCUMENTS

4,664,452 4/1987 Kubota et al. ..................... 303/22.8
4,708,225 11/1987 Feldman et al. ................ 340/452 X

FOREIGN PATENT DOCUMENTS

0188685 11/1985 European Pat. Off. .
0231829 1/1987 European Pat. Off. .
3428192 2/1986 Fed. Rep. of Germany .
3524932 1/1987 Fed. Rep. of Germany .
925716 5/1982 U.S.S.R. .
87/05571 9/1987 World Int. Prop. O. .

Primary Examiner—Jin F. Ng
Assistant Examiner—Jeffery A. Hofsass
Attorney, Agent, or Firm—Horst M. Kasper

[57] ABSTRACT

An overload warning system for a trailer brake cylinder of a trailer brake system having a nominal deceleration rate. It has been found that previous temperature sensing overdue warning systems have a disadvantage that undue delay occurs and that no warning signal is initiated until after damage to the trailer brakes occurs. The present invention proposes that the tractor brake system and the trailer brake system compare their received operating control signals from which they form a ratio factor and then produce a warning signal when the ratio factor changes beyond a predetermined critical change velocity. The present invention employs the rapid drop in braking force caused by a brake overload and uses the rapid drop and increase brake demand for readjusting the brake deceleration. The present invention is used for uniquely recognizing the "Fading" effect of the trailer brake system.

20 Claims, 2 Drawing Sheets

OVERLOAD WARNING SYSTEM FOR A TRAILER BRAKE ARRANGEMENT

This is a continuation of application Ser. No. 07/301,213, filed Jan. 24, 1989 which is now abandoned, which in turn is a continuation of application Ser. No. 280,467, filed Dec. 6, 1988 which is now abandoned.

FIELD OF THE INVENTION

This invention relates to an overload warning system for a trailer brake which is energy-operated by means of apparatus located in a trailer braking system to effectively control the deceleration rate of a trailer.

BACKGROUND OF THE INVENTION

A trailer brake system of prior art types deals with the main concept of receiving a signal from the leading truck tractor for causing the deceleration of the command to the tractor brakes, which control the command to the pressure trailer brakes so that the drawn trailer will receive the same identical brake deceleration command as does the pulling truck tractor. The trailer brake system includes a control circuit which establishes the control rate of the trailer brake deceleration. Since an identical brake deceleration rate results in a constant braking distance of the tractor, an identical braking distance results in the trailer so that the same velocity is experienced by the tractor and the trailer. These results determine the control factors of the control circuit. Such a prior art trailer brake system is shown and disclosed in German Patent No. DE 27 52 641 A1. The tractor and trailer are appropriately connected together by a conventional coupler. When the brake is activated by means of air pressure supplied to the tractor brake, the trailer has the tendency to push into the tractor. As a consequence of the amount of pressure supplied to the trailer brake cylinders or by a modification of the intensity of the energy, the trailer brake system will assure that during such brake action the force which pushes against the tractor in the forward direction will be limited to a given predetermined value. This pushing force of the trailer brake system results in an increase in the deceleration signal. The goal of such control action is the equalization of the trailer brake system deceleration rate with that of the tractor. As soon as the trailer brake system reaches such a predetermined value, the trailer moves toward the forward direction of travel.

An overload warning, which is suitable for at least one trailer brake in such a brake system, is shown and disclosed in the International Patent Application No. WO 84/00406. This type of the state of the art is thus used as a pattern for new developments. With this state of technology, the measure for the load on the trailer brake is the temperature dependent developed in the vicinity of the brake drum or brake disc. By means of a temperature comparator, a warning circuit is normally activated at high temperatures to result in the actuation of optical and acoustic signals.

A disadvantage with this type of prior art operation is the sluggishness or undue delay in the temperature sensing. The resulting high temperature and the excessive load on the trailer brake can have a damaging effect before a warning is initiated, which is a consequence of the sluggishness.

OBJECTS AND SUMMARY OF THE INVENTION

This invention has an object of improving a warning device for overload conditions which employs a simple means so that the warning indication takes place with as little delay as possible.

A trailer brake in a trailer braking application is already described in German Patent No. DE 27 52 641 A1 in comparison to a traditional brake in a trailer brake system, as shown in WABCO Pamphlet entitled "Trailer Relay Emergency Valve, 971 002, Part 2", issued August, 1981, pages 1-8. With such trailer brake systems, which are still in universal use the driver of the rig controls the amount of pressure conveyed to the tractor brakes and also conveyed to the trailer brakes. In case of an air pressure system, a tractor brake valve can be used in conjunction with a trailer control valve and thus for a trailer brake valve. The amount of pressure supplied to the trailer is proportional to the braking force required. This causes a braking force to be generated in the tractor and the trailer. The magnitude of the braking force, in turn, will have a bearing on the amount of the brake deceleration of the tractor. Should the trailer brake reach the limit of its capacity, its braking force and thus its braking acceleration will decline for the tractor, even if the pressure supplied remains the same. The driver will recognize this phenomenon which is known as "Fading". Normally, he can adjust the mode of operation in such a way that the trailer brake will be returned from the limit of its load capacity. With a trailer brake system according to German Patent No. DE 27 52 641 A1, the driver cannot recognize any "Fading" effect, since the pressure which is received by the trailer brake without any action on the part of the driver will automatically compensate any decline in braking force which the "Fading" effect may cause.

Accordingly, another object of this invention provides an opportunity for the driver to recognize a "Fading" effect for a trailer brake system by very simple means.

As far as the invention is concerned, a tractor brake or a trailer brake will form the component part for the respective tractor braking system o the trailer braking system, which will generate the braking force. In the case of a non-wear free-type brake, the system constitutes a group which consists of the wheel brake, the clamping mechanism, and intermediate linkage components. In the case of air pressure, the means for the clamping mechanism is normally a brake cylinder. Under a tractor braking system trailer braking system, one understands normally the complete system, including tractor brake and trailer brake, as well as power, control, and signal lines along with the pressure storage and the control equipment.

The trailer brake system can consist of one or more trailer brakes. In the case of several trailer brakes, an overload warning system for each individual trailer brake or for several trailer brakes as a common unit can be used.

Further, the invention is adaptable to every type of energy braking application. For example, one can consider a source of energy, such as, air pressure, electrical energy, or manual power. An example of suitable pressures are compressed pneumatics and hydraulics and/or a combination thereof.

The intensities of force exerted by trailer brakes and/or tractor brakes, can be identified directly, i.e., in the case of air pressure as braking pressure in the brake cylinder. The intensities referred to can also be referred to indirectly, such as in a control unit which includes a control line. In the case of air pressure, the control pressure, especially within a control valve or a relay valve, and the respective control line is considered. A comparative embodiment is constructed in such a way that it will only become effective when the pressure leading to the trailer brake and also the trailer control signal reach a predetermined value. This design will prevent a malfunction at a lower intensity of the pressure supplied. Such malfunctions can be incurred by intentional and unintentional functions of control apparatus within the trailer braking system. For example, when an air pressure forms a source of power, a load dependent braking force regulator with offset characteristics should be used so that in its initial phase it will eliminate pressure having an unregulated intensity.

An advantageous conception of this invention serves as a control circuit for the desired value of the trailer deceleration within the trailer brake system. The connection between tractor and trailer should include a suitable coupler between tractor and independent trailer, such as a trailer hitch, or a connection between trailer and tractor which is rigidly coupled, such as a saddle coupling or king pin connection.

Another advantage of the present invention is to provide an optical or acoustical alarm when a warning signal is produced by a comparator circuit.

The tractor and the trailer each have a primary brake system. The tractor and/or the trailer can additionally be equipped with an auxiliary brake system. This auxiliary brake system will, in case of a malfunction, act as a safeguard for the system by maintaining an emergency brake capability. The tractor can also be equipped with a continuous braking system in addition to the standard operating brake. The continuous braking system is normally used in cases where long-term braking is required, while reduced braking forces or deceleration requirements apply as is the case with travel on downhill roadways. Preferred methods for continuous braking are wear-free designs, such as retarders or engine exhaust brakes. A "retarder" uses the principle of employing a circulating pump or an Eddy current brake. Its braking force can be adjusted in steps by adjusting the control current gradually, i.e., with a step-like tractor energy signal, so that the braking force can be adjusted in steps. An engine exhaust brake uses a reducing valve or similar device for the tractor exhaust system in the exhaust pipe of the drive motor. Normally, such control energy can be used only in one single step, i.e., it is switched ON or OFF. Its braking force is dependent on the RPM of the motor. This means that the pressure accumulation retarder will produce a varying brake retardation at even tractor energy signal and changing braking force.

All of these variations should be considered for the tractor braking system as well as the trailer braking system in the sense of this invention, and may be considered as encompassing a given continuous braking system.

The invention can also be used for the frequent case of having to combine one type of braking system with that of a different type to form one total system. It is customary to activate the continuous braking system of the tractor in order to activate, in turn, the braking system for the trailer.

In the latter case, the continuous braking system acts as a pressure accumulation decelerator, which means that the relationship between braking force and engine speed presents a special case. With a reduced engine speed, the decreased braking force will influence the brake deceleration rate decline, i.e., deceleration of tractor braking and that of the trailer braking. As a consequence, the power supply to the trailer brake system will also decrease so that a lower trailer braking signal will be produced. As a consequence, the constancy of the tractor signal will change the ratio of the relationship which, in turn, may produce the possibility of malfunctions. It is, therefore, advisable to adjust the tractor braking signal of a pressure accumulator according to the relationship of RPM of the motor as well as the brake force.

In accordance with the present invention, there is provided an overload warning system having at least one trailer brake cylinder located in a trailer brake system and activated by pressure in such a way that the trailer brake system forms a control circuit for controlling the trailer brake deceleration rate, the nominal value of which is produced by a pulling truck tractor, a first sensor for sensing the pressure level in the tractor brake cylinder which is connected to a first pressure reservoir and for producing a corresponding tractor pressure signal, a second sensor for sensing the pressure level in the trailer brake cylinder which is connected to a second pressure reservoir and for producing a corresponding trailer pressure signal, a comparator for receiving the corresponding tractor and trailer pressure signals, and the comparator is adapted to compare the ratio between the corresponding tractor and trailer pressure signals and is adapted to produce a warning signal when the ratio exceeds a predetermined critical velocity value.

DESCRIPTION OF THE DRAWINGS

The above objects and other attendant features and advantages will be more readily appreciated as the present invention becomes better understood by reference to the following detailed description when considered in conjunction with the accompanying drawings, wherein.

The embodiments have substantially identical applications so that the reference symbols for elements having identical functions are the same. The solid lines indicate the air supply lines, the dotted lines signify the control lines, and the dot-dashed lines represent signal lines in both FIGS. 1 and 2.

DETAILED DESCRIPTION OF THE INVENTION

Figure 1:
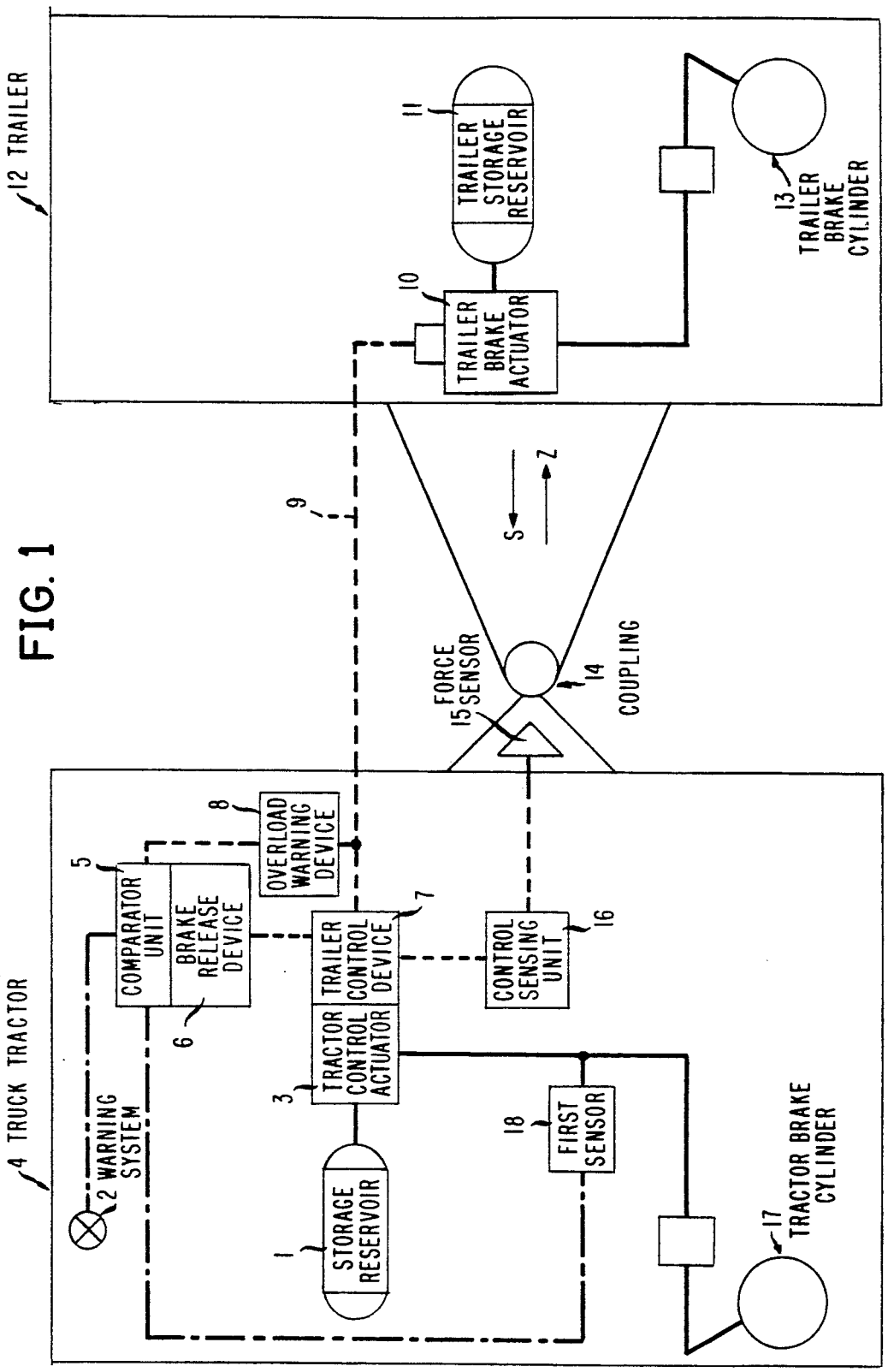
FIG. 1 shows a schematic block diagram of a motor vehicle with trailer brake system, complete with overload protection and/or warning system for the trailer brake.

Referring now to the drawings, and in particular to FIG. 1, there is shown one embodiment of a tractor trailer brake control system for motor vehicles.

The motor vehicle shown in FIG. 1 consists of a leading truck tractor 4 and a following truck trailer 12 coupled thereto.

The trailer 12 has a power-operated trailer brake cylinder 13. The brake cylinder 13 is part of the overall trailer braking system which includes elements 7, 10, 11, 13, 15, and 16. The brake system consists of an air supply reservoir 11, a trailer brake controller unit 10, and a trailer brake cylinder 13 which are located on the trailer 12 while a trailer control device 7, a pressure sensor 15, and a control sensing unit 16 are located on the truck tractor 4.

The truck tractor 4 is equipped with a tractor brake cylinder 17 which is power-operated by fluid pressure. This brake apparatus of a tractor brake system includes elements 1, 3, and 17. The system is composed of an air supply reservoir 1, a tractor control unit 3, and a tractor brake cylinder 17.

The tractor control actuator 3 and the trailer brake actuator 10 are shown as two separate individual units They are schematic devices which are part of the air supply system. The tractor brake cylinder 17 or the trailer brake cylinder 13 may take the form of braking force regulators, relay valves, or the like.

The elements 7, 10, 11, 13, 15, and 16 of the trailer brake system form a control circuit, the main function of which is to control the trailer brake deceleration operation. The desired braking rate of the trailer is dictated by the air supply pressure that is fed to the tractor brake cylinder 17 by activating the tractor control unit 3. In other words, the braking deceleration of the trailer is proportional to the tractor brake deceleration since the air supply to the trailer brake cylinder is controlled thereby. That is, the trailer brake deceleration rate is more or less equal to the brake deceleration rate of the truck tractor.

As shown, a coupling 14 is used to connect the tractor 4 to the trailer 12. The coupling 14 experiences a pulling action in the direction of arrow Z when the tractor 4 is accelerating, and undergoes a pushing effect or effort by the trailer 12 in the direction of arrow S during deceleration. The pressure sensor 15 senses and monitors the forces acting either in the direction of arrow Z or in the direction of arrow S. The sensor 15 produces a control signal which corresponds to the respective force at the time, and which is fed to the control unit 16. The output of the control unit 16 is connected to the input of the trailer control device 7 which generates an appropriate output signal. The output signal is produced when the force signal assumes a predetermined value, or when it falls within a given range which is about to be exceeded. This predetermined value can be dependent velocity the direction of push force S or pull force Z exerted between the vehicles according to particular properties of the vehicle train.

The trailer control device 7 is connected with the tractor control device and is connected by way of a control line 9 to the trailer brake device 10.

The trailer control device 7 is designed in such a way that depending on the output signal of the control unit 16, the strength of the control signal it generates and feeds into the control line 9 will either increase or decrease.

In order to operate the tractor brake cylinder 17 as well as the trailer brake 13, the driver of the tractor vehicle will initiate a brake application or a brake release function on the tractor control unit 3. In the brake application mode, the storage reservoir 1 will provide a pressure to the tractor brake cylinder 17. The amount of pressure will depend on the degree of requested brake command force applied to the tractor control unit 3. At the same time, the actuation of the tractor control device 3 causes the actuation of the trailer control device 7. The amount of energy conveyed to device 7 depends on the activating force of unit 3. This, in turn, generates device 7 to a respective control signal which is conveyed by way of a control line 9 to the trailer brake system 10. This will provide a given pressure to the trailer brake cylinder 13 from the trailer storage reservoir 11. The force sensor 15 will now generate an electrical signal which is fed to the control unit 16. When the force signal reaches the predetermined value or when it falls within the predetermined range, the control unit 16 will generate a feedback signal to the trailer control device 7 whereupon the control signal on control line 9 will increase or decrease until the control signal reaches the predetermined value or loses its tendency to fall outside of the predetermined range. Any tendency of the force signal to signify a too high a value in a pushing direction of arrow S will result in a drop in braking effort. The trailer brake system consisting of elements 7, 10, 11, 13, 15, and 16 will counteract this effect by increasing the pressure supply from reservoir 11.

In addition to effectively and efficiently controlling the braking of the tractor and trailer, the embodiment includes an overload warning system which consists of elements 5, 8, and 18 for the trailer brake cylinder 13. The warning system includes a first sensor 18, a second sensor 8, and a comparator 5. The first sensor 18 monitors the amount of pressure fed to the tractor brake cylinder 17, and produces a corresponding tractor pressure signal which is conveyed to the comparator 5. The second sensor 8 monitors the amount of pressure received by the trailer brake cylinder 13, and produces a corresponding trailer pressure signal to the comparator unit 5. The comparator unit 5 is constructed in such a way that it forms a ratio between the input signals, and a warning signal to be produced when this ratio changes with a predetermined critical velocity or a higher change velocity.

It is known that all brakes, including trailer brakes 13, exhibit a sharp drop in their braking effort at or near the end of their load capacity. In the above-mentioned application as, the control circuit for controlling the trailer brake deceleration rate, the trailer brake system including elements 7, 10, 11, 13 15 and 16 attempts to compensate for such brake effort loss of the trailer brake 13 by increasing the pressure supplied at or near the end of the load capacity. The increase in trailer pressure signal, namely, the pressure rise is used by the overload warning devices 5, 8, and 18.

The extreme brake force drop is generally referred to as "Fading". The "Fading" of the trailer brake 13 will also be referred to as a "Fading" signal, which results in a steep rise of the trailer pressure signal.

If the trailer brake indicates a "Fading" action, the tractor brake 17 can also be assumed to be "Fading" or it can, in some cases, remain normal. In the former alternative, the brake force decline in the trailer brake 13 can be tolerated fully or partially because of the brake force decline of the tractor brake 17 whereby, in this case, the intensity of the energy induced into the trailer brake cylinder 13 is not or is only minutely raised, which results in the fact that the ratio formed by the pressure signals does not change, or changes with less than the critical change velocity. In this case, the overload warning device (5, 8, 18) is not effected, but this is not really required, as the driver of the tractor will readily recognize the "Fading" effect in the form of a declining brake deceleration, as is normally the case with a traditional brake application. With the latter alternative, the rise in the trailer pressure signal results in the respective change in the pressure signal ratio as the tractor pressure signal will remain unchanged. The comparator unit 5 will result in a warning signal when the change velocity of the ratio value reaches the predetermined critical value or exceeds such a critical value. Whether the ratio value changes in the direction o increasing values or in the direction of decreasing values, depends on the design of the comparator unit 5 and whether the trailer pressure signal is the nominator or the denominator of the ratio value.

This occurs almost without any delay. The overload warning device 5, 8, 18 initiates the task of accomplishing the warning with as little delay as possible.

The first embodiment shows a design for the warning signal, such as an optical or acoustic warning device 2, which is activated by the comparator unit 5 as well as a brake release system 6. The warning unit 2 converts the warning signal into an optical or acoustic signal. The brake release system is designed in such a way that the warning signal generates a control signal with which it creates a peak value and/or a reduction of the control pressure which acts on the trailer control system 7 and a generated control signal is conveyed to the control line 9. By means of placing the trailer control device 7 in line, the brake release device 6 will control the trailer brake during receipt of the warning signal in such a way that the signal flowing to the trailer brake is limited to a peak value and/or reduced, beginning with the existing value. The overload warning system (5, 8, 18) also serves as an overload protection for the trailer brake cylinder 13.

The brake release device 6 can also be used with the warning system 2 in a different manner. It is possible to assume that the utility range of the brake release device 6 is limited, because of its automatic activation in the braking process which may not be acceptable in some cases.

In particular, the comparator unit 5 operates with electronic circuits and components. When the tractor control unit 3 is activated, an integrated clock generator is actuated. At the beginning of a time sequence of the clock generator, the comparator unit 5 requests a reading from the first sensor 18 as well as the second sensor 8 to form a ratio value. The ratio formed at the beginning of a time sequence is stored in an interim register, and compared with the ratio value formed at the end of the time sequence. If the ratio value which was formed at the end of the time sequence deviates by a critical amount or more, a warning signal circuit will be activated by way of an integrated switch. According to the above the deviation causing, the closing of the warning signal circuit can be a positive or a negative variation. This will depend on whether the comparator unit uses the trailer control signal in the numerator or in the denominator in the ratio value. The comparator unit can also be designed in such a way that the clock generator will be activated only when the trailer control signal reaches a predetermined level. With this design, any malfunction can be prevented.

The comparator unit 5 can be designed in such a way that it continues to operate in the manner described above after deactivation of the tractor control system 3 for a predetermined time period. This makes it possible that in case of several successive brake application the beginning and the end of a time sequence fall into different brake application. Hence, the overload warning system (5, 8, 18) is also effective with such a brake operation.

The comparator unit 5 can also be designed in such a way that it determines the differential between control signals at the beginning and at the end of a time sequence, and activate the warning signal circuit upon exceeding of a critical differential.

The present embodiment measures the pressure in the tractor brake cylinder 17 by means of the first sensor 18, whereas the second sensor 8 measures the pressure in the trailer brake cylinder 13 indirectly through the control signal line 9. In other words, the first sensor 18 records the intensity of the pressure in the tractor brake, whereas the second sensor 8 records the intensity of the force signal in the control unit for controlling the pressure in the trailer brake cylinder 13. It can be seen that the second sensor 8 is similar to the first sensor 18 but is part of the trailer brake system, and the first sensor 18 is similar to the second sensor 8 but is part of the tractor brake system.

The embodiment shows the trailer brake system (7, 10, 11, 13, 15, 16) in which the respective components, such as trailer control unit 7, second sensor 8, force sensor 15, and control unit 16 are mounted on the tractor proper 4. This arrangement has the advantage that a traditional trailer brake system can be used without modification to the given trailer, and built into a control circuit with a control based on the trailer deceleration rate, which makes the circuit adaptable to this invention. It is understood that by not using a traditional trailer brake system, the brake components in the tractor can be mounted completely or partially on the trailer.

Figure 2:
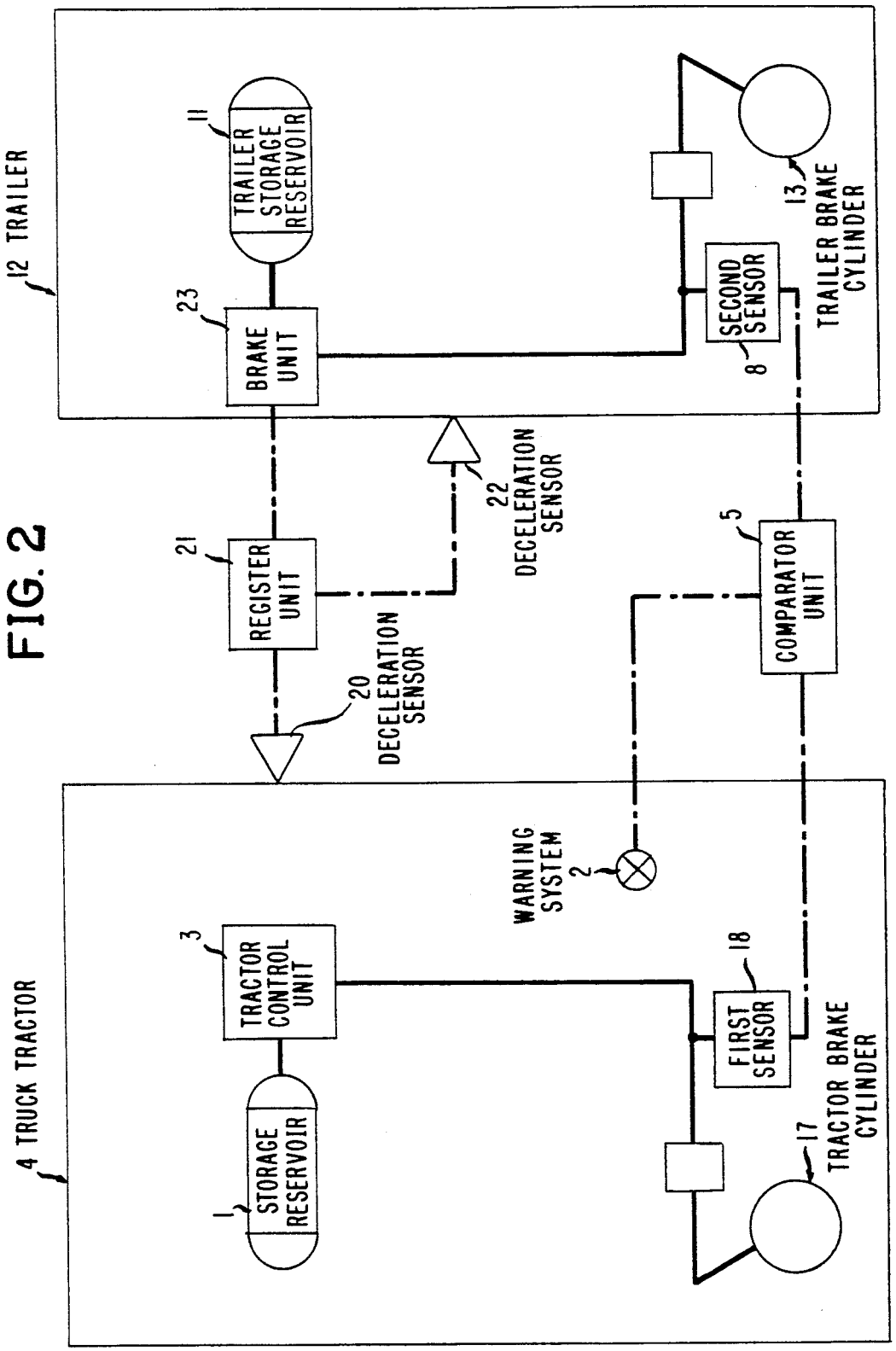
FIG. 2 shows a schematic block diagram of a different embodiment of the motor vehicle according to FIG. 1

A second embodiment is shown in FIG. 2 and is slightly different from the first embodiment.

The measurement of the brake deceleration rate of the tractor 4 is accomplished by a deceleration sensor 20 which generates a deceleration signal which will be initiated by the brake deceleration of the tractor. To record the trailer brake deceleration, a deceleration sensor 22 is added to the system to provide a deceleration signal rate of the trailer. The respective deceleration signals are fed to a recorder or register which generates a control signal when the trailer deceleration signal varies a given amount from a preselected value of the tractor deceleration. Which of these chosen values is applicable depends on the specific design of the recording or register unit 21.

The trailer brake unit 23 receives the control signals from the recorder or register 21, and is designed to control the force in the trailer brake cylinder 13 received from the pressure storage reservoir 11. In this way, the braking force in the trailer brake 13 is controlled in such a manner that the trailer brake deceleration will be substantially equal to the brake deceleration of the tractor, even with some tolerance deviations.

The second sensor 8 for the overload warning unit (5, 8, 18) senses the pressure in the supply line leading to the trailer brake cylinder 13 and directly records the force of the pressure supplied similar to that of first sensor 18.

Whereas, the deceleration sensor 20 on the tractor 4 and the deceleration sensor 22 on the trailer 12 are part of the tractor and the trailer units. Whereas, the comparator unit 5 and the evaluation unit 21 are located between the tractor 4 and the trailer 12.

It is also understood that both units may be located either in the tractor 4 or alternatively in the trailer 12, as may be preferred and which is practical. It will be recognized that such an alternative mounting possibility also exists for the trailer brake unit 23. It will also be recognized that the trailer brake unit 23 can be replaced by the trailer brake 10 of FIG. 1, in which case the control must take place by way of a control line 9 and a trailer control device 7 which simulates the trailer control function, and which utilizes the control signal from the user unit 21.

The embodiment of FIG. 2 does not require the force generating connection 14 between tractor and trailer, as shown in the embodiment of FIG. 1. According to the invention, the trailer 12 is normally pulled by the tractor 4 without any problems and it can be suitably coupled in a conventional way with the brake system.

In view of the many possible variations, the tractor brake cylinder 17 and the trailer brake cylinder 13 and the tractor brake system and the trailer brake system are applicable to numerous design changes. Even in the case of several tractor brakes and trailer brakes in the tractor brake system and in the trailer brake system, the overall braking system will generally follow the above theories.

The expert will recognize that the protective range for the present invention is not exhaustively described as far as all possible applications are concerned, but only those design possibilities have been covered which are directly covered by the patent claims.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. An overload warning system for at least one drive vehicle brake activated by an energy supplied and located in a driven vehicle brake system, said driven vehicle brake system forming a control circuit for controlling the driven vehicle deceleration rate, wherein a nominal value of said driven vehicle deceleration rate is being produced by an energy supplied to at least one driving vehicle brake in a driving vehicle, said overload warning system comprising:
    (a) a first sensor for sensing the energy level in said driving vehicle brake for producing a corresponding driving vehicle energy signal,
    (b) a second sensor for sensing the energy level in said driven vehicle brake for producing a corresponding driven vehicle energy signal,
    (c) a comparator receiving said corresponding driving vehicle and driven vehicle energy signals, and
    (d) said comparator being adapted to form a ratio between said corresponding driving vehicle and driven vehicle energy signals and being adapted to produce a warning signal when said ratio of the energy signals changes with at least predetermined critical change velocity.

2. The system, according to claim 1, wherein the first sensor and the second sensor directly senses the pressure level acting in the driving vehicle brake or in the driven vehicle brake.

3. The system, according to claim 1, wherein at least one of the first sensor and the second sensor is located on a control apparatus determining the energy level in at least one of said driving vehicle brake and said driven vehicle brake respectively.

4. The system, according to claim 1, wherein the comparator is designed in such a way that it will be activated only after the driven vehicle energy signal has reached a predetermined value.

5. The system, according to claim 1, wherein the driven vehicle and the driving vehicle are coupled by at least force transmitting means, said system having a force recording sensor sensing the force in the direction of pull and the direction of push by said driven vehicle for producing a force signal corresponding to pulling and pushing force which is conveyed by a corresponding control unit which belongs to the driven vehicle brake system, the control of the driven vehicle brake deceleration rate being accomplished in such a way that said control unit directs the energy level which is being supplied to the driven vehicle brake when the force signal reaches a predetermined value or falls within a predetermined range around the predetermined value.

6. The system, according to claim 1, wherein the comparator is connected to a warning device which is controlled by said warning signal.

7. The system, according to claim 1, wherein the comparator is connected to a brake release unit which is adapted in such a manner that upon occurrence of said warning signal, the energy level applied to the driven vehicle brake is controlled in such a way that the energy level directed to the driven vehicle brake is one of an energy level limited to a peak value or of an energy level reduced from an existing energy level value.

8. The system, according to claim 1, wherein said energy of at least one of said driven vehicle brake and said driving vehicle brake is the pressure of a pressure medium.

9. The system, according to claim 8, wherein compressed air is used as the pressure medium.

10. The system, according to claim 8, wherein fluid pressure is used as the pressure medium.

11. The system, according to claim 9, wherein the driving vehicle and the driven vehicle each have a separate pressure reservoir.

12. The system, according to claim 10, wherein the driving vehicle and the driven vehicle each have a separate pressure reservoir.

13. The system, according to claim 1, wherein said energy of at least one of the driven vehicle brake and driving vehicle brake is electrical energy.

14. The system, according to claim 1, wherein the braking effort of at least one of the driving vehicle brake and the driven vehicle brake is manually initiated.

15. The system, according to claim 1, wherein at least one of the driving vehicle brake and the driven vehicle brake form part of a primary braking system of the respective vehicle.

16. The system, according to claim 1, wherein at least one of the driven vehicle brake and the driving vehicle brake form part of an auxiliary braking system of the respective vehicle.

17. The system, according to claim 1, wherein the driving vehicle brake is part of a continuous truck braking system.

18. The system, according to claim 17, wherein the continuous braking system is a retarder system.

19. The system, according to claim 17, wherein the continuous braking system is an engine exhaust brake.

20. The system, according to claim 1, wherein the driven vehicle brake is part of a continuous truck braking system.

* * * * *